United States Patent
Lahiri et al.

(10) Patent No.: US 12,249,739 B2
(45) Date of Patent: Mar. 11, 2025

(54) THREE-DIMENSIONAL BATTERY HAVING CURRENT-REDUCING DEVICES CORRESPONDING TO ELECTRODES

(71) Applicant: Enovix Corporation, Fremont, CA (US)

(72) Inventors: Ashok Lahiri, Cupertino, CA (US); Robert M. Spotnitz, Pleasanton, CA (US)

(73) Assignee: Enovix Corporation, Fremont, CA (US)

( * ) Notice: Subject to any disclaimer, the term of this patent is extended or adjusted under 35 U.S.C. 154(b) by 11 days.

(21) Appl. No.: 18/220,690

(22) Filed: Jul. 11, 2023

(65) Prior Publication Data

US 2024/0030569 A1     Jan. 25, 2024

Related U.S. Application Data (63) Continuation of application No. 16/777,142, filed on Jan. 30, 2020, now abandoned, which is a
(Continued)

(51) Int. Cl.
*H01M 50/581*     (2021.01)
*H01M 4/13*     (2010.01)
(Continued)

(52) U.S. Cl.
CPC .......... *H01M 50/581* (2021.01); *H01M 4/13* (2013.01); *H01M 4/485* (2013.01); *H01M 4/505* (2013.01);
(Continued)

(58) Field of Classification Search
CPC ............. H01M 50/581; H01M 50/574; H01M 50/583; H01M 4/13; H01M 4/485;
(Continued)

(56) References Cited

U.S. PATENT DOCUMENTS

| 4,113,579 A | 9/1978 | Randall et al. |
| 4,376,031 A | 3/1983 | Andrus et al. |
(Continued)

FOREIGN PATENT DOCUMENTS

| CA | 2388711 A1 | 5/2001 |
| CN | 1286811 A | 3/2001 |
(Continued)

OTHER PUBLICATIONS

Waidmann, S. et al., Tuning nickel silicide properties using a lamp based RTA, a heat conduction based RTA or a furnace anneal, Microelectronic Engineering 83, 2006, 2282-2286 Oct. 19, 2006.
(Continued)

*Primary Examiner* — Stephen J Yanchuk
(74) *Attorney, Agent, or Firm* — HALEY GUILIANO LLP (57) ABSTRACT

Various three-dimensional battery structures are disclosed, in certain embodiments comprising a battery enclosure and a first plurality of electrodes within the enclosure. The first plurality of electrodes includes a plurality of cathodes and a plurality of anodes. The first plurality of electrodes includes a second plurality of electrodes selected from the first plurality of electrodes. The three-dimensional battery includes a first structural layer within the battery enclosure. Each of the second plurality of electrodes protrudes from the first structural layer. The three-dimensional battery includes a plurality of electrical current-reducing devices within the enclosure. Each of the second plurality of electrodes is coupled to one of the plurality of current-reducing devices.

14 Claims, 6 Drawing Sheets

Related U.S. Application Data continuation of application No. 14/858,113, filed on Sep. 18, 2015, now abandoned, which is a continuation of application No. 12/013,397, filed on Jan. 11, 2008, now Pat. No. 9,166,230.

(60) Provisional application No. 60/884,843, filed on Jan. 12, 2007, provisional application No. 60/884,828, filed on Jan. 12, 2007.

(51) Int. Cl.
   *H01M 4/485* (2010.01)
   *H01M 4/505* (2010.01)
   *H01M 4/525* (2010.01)
   *H01M 4/58* (2010.01)
   *H01M 4/62* (2006.01)
   *H01M 4/64* (2006.01)
   *H01M 10/052* (2010.01)
   *H01M 10/0525* (2010.01)
   *H01M 10/058* (2010.01)
   *H01M 10/42* (2006.01)
   *H01M 4/02* (2006.01)
   *H01M 50/574* (2021.01)
   *H01M 50/583* (2021.01)

(52) U.S. Cl.
   CPC ......... *H01M 4/525* (2013.01); *H01M 4/5825* (2013.01); *H01M 4/62* (2013.01); *H01M 4/64* (2013.01); *H01M 10/052* (2013.01); *H01M 10/0525* (2013.01); *H01M 10/058* (2013.01); *H01M 10/4235* (2013.01); *H01M 2004/021* (2013.01); *H01M 50/574* (2021.01); *H01M 50/583* (2021.01); *H01M 2200/106* (2013.01)

(58) Field of Classification Search
   CPC .... H01M 4/505; H01M 4/525; H01M 4/5825; H01M 4/62; H01M 4/64; H01M 10/052; H01M 10/0525; H01M 10/058; H01M 10/4235; H01M 2200/106; H01M 2004/021
   See application file for complete search history.

(56) References Cited

U.S. PATENT DOCUMENTS

| | | |
|---|---|---|
| 4,496,640 A | 1/1985 | Kobayashi et al. |
| 4,820,599 A | 4/1989 | Furukawa et al. |
| 4,996,129 A | 2/1991 | Tuck |
| 5,238,759 A | 8/1993 | Plichta et al. |
| 5,294,504 A | 3/1994 | Otagawa et al. |
| 5,322,300 A | 6/1994 | Mistrater et al. |
| 5,709,962 A | 1/1998 | Bailey |
| 5,939,206 A | 8/1999 | Kneezel et al. |
| 5,993,990 A | 11/1999 | Kanto et al. |
| 6,090,505 A | 7/2000 | Shimamura et al. |
| 6,143,673 A | 11/2000 | Jang et al. |
| 6,235,427 B1 | 5/2001 | Idota et al. |
| 6,287,371 B1 | 9/2001 | Ota et al. |
| 6,432,579 B1 | 8/2002 | Tsuji et al. |
| 6,432,585 B1 | 8/2002 | Kawakami et al. |
| 6,432,586 B1 | 8/2002 | Zhang |
| 6,458,485 B2 | 10/2002 | Yanai et al. |
| 6,495,283 B1 | 12/2002 | Yoon et al. |
| 6,498,406 B1 | 12/2002 | Hoeriuchi et al. |
| 6,525,391 B1 | 2/2003 | Bertrand et al. |
| 6,548,208 B1 | 4/2003 | Kasamatsu et al. |
| 6,645,675 B1 | 11/2003 | Munshi |
| 6,679,925 B1 | 1/2004 | Tanizaki et al. |
| 6,791,737 B2 | 9/2004 | Giron |
| 6,821,673 B1 | 11/2004 | Hamada et al. |
| 6,833,010 B2 | 12/2004 | Asahina et al. |
| 6,835,496 B1 | 12/2004 | Kaminaka et al. |
| 6,878,173 B2 | 4/2005 | Miyahisa et al. |
| 7,056,455 B2 | 6/2006 | Matyjaszewski et al. |
| 7,066,971 B1 | 6/2006 | Carlson |
| 7,153,609 B2 | 12/2006 | Kubo et al. |
| 7,309,548 B2 | 12/2007 | Ota et al. |
| 7,402,829 B2 | 7/2008 | Green |
| 7,662,265 B2 | 2/2010 | Chiang et al. |
| 7,794,881 B1 | 9/2010 | Fujimoto et al. |
| 8,101,298 B2 | 1/2012 | Green et al. |
| 8,192,788 B1 | 6/2012 | Shah et al. |
| 8,305,725 B2 | 11/2012 | Ooi et al. |
| 8,475,957 B2 | 7/2013 | Ramasubramanian et al. |
| 8,527,395 B2 | 9/2013 | Pylant |
| 8,580,424 B2 | 11/2013 | Kim |
| 8,691,450 B1 | 4/2014 | Srinivasan et al. |
| 8,841,030 B2 | 9/2014 | Lahiri et al. |
| 8,999,558 B2 | 4/2015 | Rust et al. |
| 9,166,230 B1 | 10/2015 | Lahiri et al. |
| 9,356,271 B2 | 5/2016 | Ramasubramanian et al. |
| 9,362,553 B2 | 6/2016 | Lahiri et al. |
| 2002/0013986 A1 | 2/2002 | Ahn et al. |
| 2002/0034685 A1 | 3/2002 | Sato et al. |
| 2002/0039283 A1 | 4/2002 | Nakamura et al. |
| 2002/0064708 A1 | 5/2002 | Asahina et al. |
| 2002/0074972 A1 | 6/2002 | Narang et al. |
| 2002/0136957 A1 | 9/2002 | Zhang et al. |
| 2003/0029495 A1 | 2/2003 | Mazur et al. |
| 2003/0082446 A1 | 5/2003 | Chiang et al. |
| 2003/0090021 A1 | 5/2003 | Kise et al. |
| 2003/0175589 A1 | 9/2003 | Kaminaka et al. |
| 2004/0064708 A1 | 4/2004 | Angelo et al. |
| 2004/0092395 A1 | 5/2004 | Hase et al. |
| 2004/0163758 A1 | 8/2004 | Kagan et al. |
| 2004/0170887 A1 | 9/2004 | Masumoto et al. |
| 2004/0185336 A1 | 9/2004 | Ito et al. |
| 2004/0214079 A1 | 10/2004 | Simburger et al. |
| 2004/0214085 A1 | 10/2004 | Sheem et al. |
| 2004/0234861 A1 | 11/2004 | Kawase et al. |
| 2004/0241540 A1 | 12/2004 | Tsutsumi et al. |
| 2005/0008939 A1 | 1/2005 | Ota et al. |
| 2005/0079418 A1 | 4/2005 | Kelley et al. |
| 2005/0079420 A1 | 4/2005 | Cho et al. |
| 2005/0079422 A1 | 4/2005 | Ko et al. |
| 2005/0095503 A1 | 5/2005 | Adachi et al. |
| 2005/0130383 A1 | 6/2005 | Divakaruni et al. |
| 2005/0208379 A1 | 9/2005 | Musha et al. |
| 2006/0019151 A1 | 1/2006 | Imachi et al. |
| 2006/0019153 A1 | 1/2006 | Imachi et al. |
| 2006/0093871 A1 | 5/2006 | Howard et al. |
| 2006/0097691 A1 | 5/2006 | Green |
| 2006/0121342 A1 | 6/2006 | Sano et al. |
| 2006/0147795 A1 | 7/2006 | Li et al. |
| 2006/0154141 A1 | 7/2006 | Salot et al. |
| 2006/0188784 A1 | 8/2006 | Sudoh et al. |
| 2006/0269845 A1 | 11/2006 | Xu et al. |
| 2006/0281007 A1 | 12/2006 | Tsutsumi et al. |
| 2007/0002523 A1 | 1/2007 | Ando et al. |
| 2007/0003829 A1 | 1/2007 | Imachi et al. |
| 2007/0037053 A1 | 2/2007 | Anantharaman |
| 2007/0059584 A1 | 3/2007 | Nakano et al. |
| 2007/0092792 A1 | 4/2007 | Kasahara et al. |
| 2007/0097481 A1 | 5/2007 | Burdis et al. |
| 2007/0105017 A1 | 5/2007 | Kawase et al. |
| 2007/0172732 A1 | 7/2007 | Jung et al. |
| 2007/0241856 A1 | 10/2007 | Ohtsuka et al. |
| 2007/0243460 A1 | 10/2007 | Carlson et al. |
| 2008/0003490 A1 | 1/2008 | Christensen et al. |
| 2008/0014499 A1 | 1/2008 | Ling |
| 2008/0032170 A1 | 2/2008 | Wainright et al. |
| 2008/0081256 A1 | 4/2008 | Madou et al. |
| 2008/0081257 A1 | 4/2008 | Yoshida et al. |
| 2008/0233455 A1 | 9/2008 | Deimede et al. |
| 2009/0035664 A1 | 2/2009 | Chiang et al. |
| 2009/0068567 A1 | 3/2009 | Konishiike et al. |
| 2009/0117269 A1 | 5/2009 | Hansen et al. |
| 2009/0117472 A1 | 5/2009 | Iwamoto |
| 2009/0123847 A1 | 5/2009 | Okada et al. |
| 2009/0142656 A1 | 6/2009 | Nathan et al. |

(56) References Cited

U.S. PATENT DOCUMENTS

| | | | |
|---|---|---|---|
| 2009/0166187 A1 | 7/2009 | Nagase et al. |
| 2009/0170001 A1 | 7/2009 | Roozeboom et al. |
| 2009/0263716 A1 | 10/2009 | Ramasubramanian et al. |
| 2009/0303660 A1 | 12/2009 | Nair et al. |
| 2010/0003603 A1 | 1/2010 | Chiang et al. |
| 2010/0040951 A1 | 2/2010 | Yamamoto et al. |
| 2010/0051856 A1 | 3/2010 | Kim et al. |
| 2010/0119936 A1 | 5/2010 | Inagaki et al. |
| 2010/0119939 A1 | 5/2010 | Misumi et al. |
| 2010/0209775 A1 | 8/2010 | Kim et al. |
| 2010/0266907 A1 | 10/2010 | Yazami |
| 2010/0285368 A1 | 11/2010 | Yamamoto et al. |
| 2011/0014522 A1 | 1/2011 | Visco et al. |
| 2011/0020701 A1 | 1/2011 | Park et al. |
| 2011/0020713 A1 | 1/2011 | Cui et al. |
| 2011/0020719 A1 | 1/2011 | Manabe et al. |
| 2011/0045168 A1 | 2/2011 | Seo et al. |
| 2011/0067228 A1 | 3/2011 | Green |
| 2011/0111283 A1 | 5/2011 | Rust et al. |
| 2011/0129732 A1 | 6/2011 | Bachrach et al. |
| 2011/0171518 A1 | 7/2011 | Dunn et al. |
| 2012/0176093 A1 | 7/2012 | Ramasubramanian et al. |
| 2013/0143120 A1 | 6/2013 | Ramasubramanian et al. |
| 2013/0189602 A1 | 7/2013 | Lahiri et al. |
| 2013/0230751 A1 | 9/2013 | Shaw |
| 2014/0335395 A1 | 11/2014 | Ramasubramanian et al. |
| 2022/0328861 A1 | 10/2022 | Armstrong et al. |

FOREIGN PATENT DOCUMENTS

| | | |
|---|---|---|
| CN | 1555588 A | 12/2004 |
| EP | 0883199 A1 | 12/1998 |
| EP | 1028476 A1 | 8/2000 |
| EP | 1100134 A1 | 5/2001 |
| EP | 1102340 A2 | 5/2001 |
| EP | 2048262 A1 | 4/2009 |
| EP | 2277214 A1 | 1/2011 |
| JP | 11-233076 A | 8/1999 |
| JP | 2000-268813 A | 9/2000 |
| JP | 2002-042791 A | 2/2002 |
| JP | 2003-217596 A | 7/2003 |
| JP | 2003-323882 A | 11/2003 |
| JP | 2006-286427 A | 10/2006 |
| JP | 2008-153033 A | 7/2008 |
| JP | 2008-153034 A | 7/2008 |
| JP | 2008-153035 A | 7/2008 |
| JP | 2008-153036 A | 7/2008 |
| KR | 10-2003-0044508 A | 6/2003 |
| NL | 1015956 C2 | 2/2002 |
| WO | 02/43168 A2 | 5/2002 |
| WO | 2003/105258 A1 | 12/2003 |
| WO | 2005/119812 A1 | 12/2005 |
| WO | 2006/056964 A2 | 6/2006 |
| WO | 2008/030215 A2 | 3/2008 |
| WO | 2008/072638 A1 | 6/2008 |
| WO | 2008/089110 A1 | 7/2008 |
| WO | 2009/129490 A1 | 10/2009 |
| WO | 2009/140300 A1 | 11/2009 |
| WO | 2010/092059 A1 | 8/2010 |
| WO | 2010/138176 A1 | 12/2010 |
| WO | 2011/154862 A1 | 12/2011 |
| WO | 2013/112670 A1 | 8/2013 |
| WO | 2014/028230 A1 | 2/2014 |

OTHER PUBLICATIONS

Wang and Cao, "Li+-intercalation Electrochemical/chromic Props of Vanadium Pentoxide Films by Sol Electrophoretic Deposition," Electrochimica Acta, 51, (2006), 4865-4872.

Whitehead et al., Current Collectors for positive electrodes of lithium-based batteries, Journal of the Electrochemical Society, 2005, A5105-A2113, 152(11) Sep. 8, 2005.

Xu et al., Nickel displacement deposition of porous silicon with ultrahigh aspect ratio, J. Elect. Soc., 2007, 154(3): 170-174.

Xu et al., Theoretical studies of displacement disposition of nickel into porous silicon with ultrahigh aspect ration, Electrochimica Acta, 2006, 52, 3901-3909.

Zhang et al., High aspect ration nickel structions fabricated by electrochemical replication of hydrofluoric acid etched silicon, Electrochemical and Solid-State Letters, 2006, 9(9): C150-C152.

"Retain." Dictionary.com. Dictionary.com, n.d. Web. Aug. 7, 2013.

Bhushan, Springer Handbook of Nanotechnology, 2nd Edition, Springer, (Nov. 6, 2006).

Bourderau et al., "Amorphous Silicon as a Possible Anode Material for Li-Ion Batteries," Journal of Power Sources, 1999, 81-82, 233-236 Sep. 30, 1999.

Broussely and Archdale, "Li-ion batteries and portable power source prospects for the next 5-10 years," J. Power Sources, 136, (2004), 386-394.

Caballero et al., "LiNi0.5Mn1.5O4 thick-film electrodes prepared by electrophoretic deposition for use in high voltage lithium-ion batteries," J. Power Sources, 156 (2006) 583.

Chamran et al., "Three Dimensional Nickel and Zinc Microbatteries", Conference Papers: 19th IEEE International Conference on MEMS, (May 8, 2006), pp. 950-953.

Chan, High-performance lithium battery anodes using silicon nanowires, Nature Nanotechnology, vol. 3, pp. 31-35, Jan. 2008.

Chang Liu, Foundations of MEMS, Chapter 10, pp. 1-55 (2006).

European Patent Office, Extended European Search Report for 12866772.2, EP 2807698, dated Oct. 8, 2015, 3 pages.

European Patent Office, Extended European Search Report for 13829954.0, EP 2885830, dated Feb. 19, 2016, 7 pages.

European Patent Office, Extended European Search Report for 14768734.7, EP 2973785, 10 pages dated Jul. 15, 2016.

European Patent Office, Extended Search Report for EP 13740825.8, dated Aug. 8, 2015, 9 pages Aug. 8, 2015.

Fergus, J.W., Ceramic and polymeric solid electrolytes for lithium-ion batteries, Journal of Power Sources, 2010, 4554-4569, 195.

Fu, Y. et al., Investigation of Aspect Ratio of Hole Drilling from Micro to Nanoscale via Focused Ion Beam Fine Milling, Proceedings of SMA Symposium, 2005, 1-5.

Golodnitsky et al., "Advanced materials for the 3D microbattery," 2006, Journal of Power Sources, 153, pp. 281-287.

Green et al., "Structured Silicon Anodes for Li Battery Applications," Electrochem & Solid State Letters, 6, 2003 A75-A79.

Harraz et al., Different behavior in immersion plating of nickel on porous silicon from acidic and and alkaline fluoride media, J. Elect. Soc., 2003, 150(5): C277-284.

Harraz et al., Immersion plating of nickel onto a porous silicon layer from fluoride solutions, Phys. Stat. Sol., 2003, 197(1): 51-56.

Iaboni et al., Li15SI4 Formation in silicon thin film negative electrodes, Journal of the Electrochemical Society, 2016, 163(2), A255-A261.

International Search Authority, PCT International Search Report and Notification of Transmittal, Int'l App. No. PCT/US08/50942, May 16, 2008.

Kanamura et. al., "Electrophoretic Fabrication of LiCoO2 Positive Electrodes for Rechargeable Lithium Batteries," J. Power Sources, 97-98 (2001) 294-297.

Kasavajjula et al., Nano- and Bulk-Silicon-Based Insertion Anodes for Lithium-Ion Secondary Cells, Journal of Power Sources, 2007, 1003-1039, 163 Nov. 9, 2006.

Kobrin et. al., "Molecular Vapor Deposition—An Improved Vapor-Phase Deposition Technique of Molecular Coatings for MEMS Devices," SEMI Tech Symp:(STS, ISM), 2004.

Köhler et al., Nanotechnology: An Introduction to Nanostructuring Techniques, 1st Edition, Wiley-VCH, (2004).

Lahiri, et al., co-pending parent U.S. Appl. No. 13/013,398, filed Jan. 11, 2008, and from which priority is claimed under 35 USC 120 as a continuation-in-part.

Lehmann, The physics of macropore formation in low doped n-type silicon, Journal of Electrochemical Society, 149(10), 1993, 2836-2843.

Li et al., "The Crystal Structural Evolution of Nano-Si Anode Caused by Lithium Insertion and Extraction at Room Temperature," Solid State Ionics, 2000, 135, 181-191 Nov. 30, 2000.

(56) References Cited

OTHER PUBLICATIONS

Long et. al., "Three-Dimensional Battery Architectures," Chemical Reviews, (2004), 104, 4463-4492.
Machine translation for Tsuchiya, JP 11-233076 A.
Machine Translation of JP2003-217596.
Maranchi et al., High capacity, reversible silicon thin-film anodes for lithium-ion batteries, Electronchemical and Solid-State Letters, 2001, 6(9), A198-A201.
Masuda, et al., "Ordered Metal Nanohole Arrays Made by a Two-Step Replication of Honeycomb Structures of Anodic Alumina," Science, New Series, vol. 268, No. 5216 (Jun. 9, 1995), pp. 1466-1468, USA.
Min et al., Fabrication and properties of a carbon/polypyrrole three-dimensional microbattery, Journal of Power Sources, 2008, 795-800, 178.
Mu et al., Silicon nanotube array/gold electrode for direct electrochemistry of cytochrome C, J. Phys. Chem. B, 2007, 111(6), 1491-1495.
Nishizawa et al., "Template Synth of Polypyrrole-Coated Spinel LiMn2O4 Nanotubules and Props as Cathode Active Materials for Li Batteries," J. Electrochem.Soc., 1923-1927 (1997).
Obrovac, M. N. et al., Reversible Cycling of Crystalline Silicon Powder, Journal of The Electrochemical Society, 2007, A103-A108, 154(2) Dec. 21, 2006.
Oukassi, S. et al., Microfabricated Solid State Thin Film Lithium Batteries, Mater. Res. Soc. Symp. Proc. vol. 973 .COPYRGT. 2007 Materials Research Society, 0973-BB01-02, 7 pgs.
P. Arora and Z. Zhang, "Battery separators," Chem. Rev., 2004, 104, 4419-4462.
P.G. Balakrishnan, R. Ramesh, and T. Prem Kumar, "Safety mechanisms in lithium-ion batteries," Journal of Power Sources, 2006, 155, 401-414.
Patent Cooperation Treaty, International Search Report for PCT/US2013/053235, dated Jan. 28, 2014, 5 pages Jan. 28, 2014.
Patent Cooperation Treaty, International Search Report issued for PCT/US2014/025200, dated Jul. 29, 2014, 4 pages Jul. 29, 2014.
Patent Cooperation Treaty, International Search Report issued on PCT/US2012/022393, dated Oct. 10, 2012, 4 pages.
Scrosati et al., Lithium batteries: Status, prospects and future, Journal of Power Sources, 2010, 195: 2419-2430 Nov. 11, 2009.
Serpo, A tenfold improvement in battery life?, ZDNet News, Jan. 15, 2008.
Shembel et. al., "Thin Layer Electrolytic Molybdenum Oxysulfides for Li Secondary Batteries With Liquid and Polymer Electrolytes," 5th Adv Batteries and Accumulators (2004).
Shin et al., "Porous Silicon Negative Electrodes for Rechargeable Lithium Batteries," J. Power Sources, 139 (2005) 314-320.
Su et al., Silicon-Based Nanomaterials for Lithium-Ion Batteries: A Review, Advanced Energy Materials, 2013, 1-23.
Teixidor et al., Fabrication and characterization of three-dimensional carbon electrodes for lithium-ion batteries, Journal of Power Sources, 2008, 730-740, 183.
Van Den Meerakker et al., "Etching of Deep Macropores in 6 in. Si Wafers," J. Electrochem. Soc. 147, 7, 2757-2761 (2000).
Vyatkin et al., "Random and Ordered Macropore Formation in p-Type Silicon," J. Electrochem. Soc. 149, 1, G70-G76 (2002).

THREE-DIMENSIONAL BATTERY HAVING CURRENT-REDUCING DEVICES CORRESPONDING TO ELECTRODES

CROSS-REFERENCE TO RELATED APPLICATIONS

This is a continuation of U.S. application Ser. No. 16/777,142, filed on Jan. 30, 2020, which is a continuation of U.S. application Ser. No. 14/858,113, filed on Sep. 18, 2015, which is a continuation of U.S. application Ser. No. 12/013,397, filed on Jan. 11, 2008 (now U.S. Pat. No. 9,166,230), which claims priority under 35 U.S.C. section 119(e) to U.S. Provisional Application No. 60/884,843, entitled "Safety Mechanisms for Three-Dimensional Energy Systems," filed on Jan. 12, 2007, and to U.S. Provisional Application No. 60/884,828, entitled "Three-Dimensional Batteries and Methods of Manufacturing Using Backbone Structure," filed on Jan. 12, 2007, each of which are hereby incorporated by reference herein in their entirety.

FIELD OF THE INVENTION

The present invention relates generally to the field of battery technology, and more particularly to safety mechanisms used in batteries.

BACKGROUND

Energy storage devices such as lithium batteries are the state of the art power sources for many electronic devices due to their high energy density, high power, and long shelf life. However, there is a risk that energy storage devices might release energy accidentally (e.g., through abuse) in an undesirable or uncontrolled manner. Building safety features into batteries can reduce this risk and improve abuse tolerance.

The safety of current lithium-ion batteries may be compromised by various mechanisms, many of which are related through a temperature increase phenomenon. Excessive heat and thermal runaway may occur due to electrolyte decomposition at overcharge and at elevated operating temperatures. Thermal runaway might also occur due to oxygen evolution in case of high voltage cathode materials such as $LiCoO_2$. In some cases, mechanical abuse can also cause active materials to short together, thereby resulting in thermal runaway. This could be caused due to overcharging the batteries, electrical shorts, or mechanical abuse related shorting. A rapid release of heat during chemical reactions pertaining to electrolyte or cathode decomposition can increase the risk of thermal runaway in conventional two-dimensional batteries.

Self-stopping devices, for example polymer or ceramic materials with Positive Temperature Coefficient (PTC) of resistance, have been used to enhance the safety of conventional two-dimensional batteries. Such materials are sometimes referred to as resettable fuses or self-regulating thermostats. For example, reference to P. G. Balakrishnan, R. Ramesh, and T. Prem Kumar, "Safety mechanisms in lithium-ion batteries," *Journal of Power Sources*, 2006, 155, 401-414 may help to illustrate the state of the art in safety mechanisms in conventional lithium-ion batteries, and is therefore incorporated by reference as non-essential subject matter herein.

Heat dissipation in a battery should be sufficient to reduce the risk of thermal runaway. However, traditional two-dimensional batteries may not dissipate sufficient heat because too much of the cross sectional area of the battery is taken up by cathode and anode materials, which typically do not conduct heat very well.

Three-dimensional battery architectures (e.g., interdigitated electrode arrays) have been proposed in the literature to provide higher electrode surface area, higher energy and power density, improved battery capacity, and improved active material utilization compared with two-dimensional architectures (e.g., flat and spiral laminates). For example, reference to Long et. al., "Three-dimensional battery architectures," *Chemical Reviews*, 2004, 104, 4463-4492, may help to illustrate the state of the art in proposed three-dimensional battery architectures, and is therefore incorporated by reference as non-essential subject matter herein.

Figure 1:
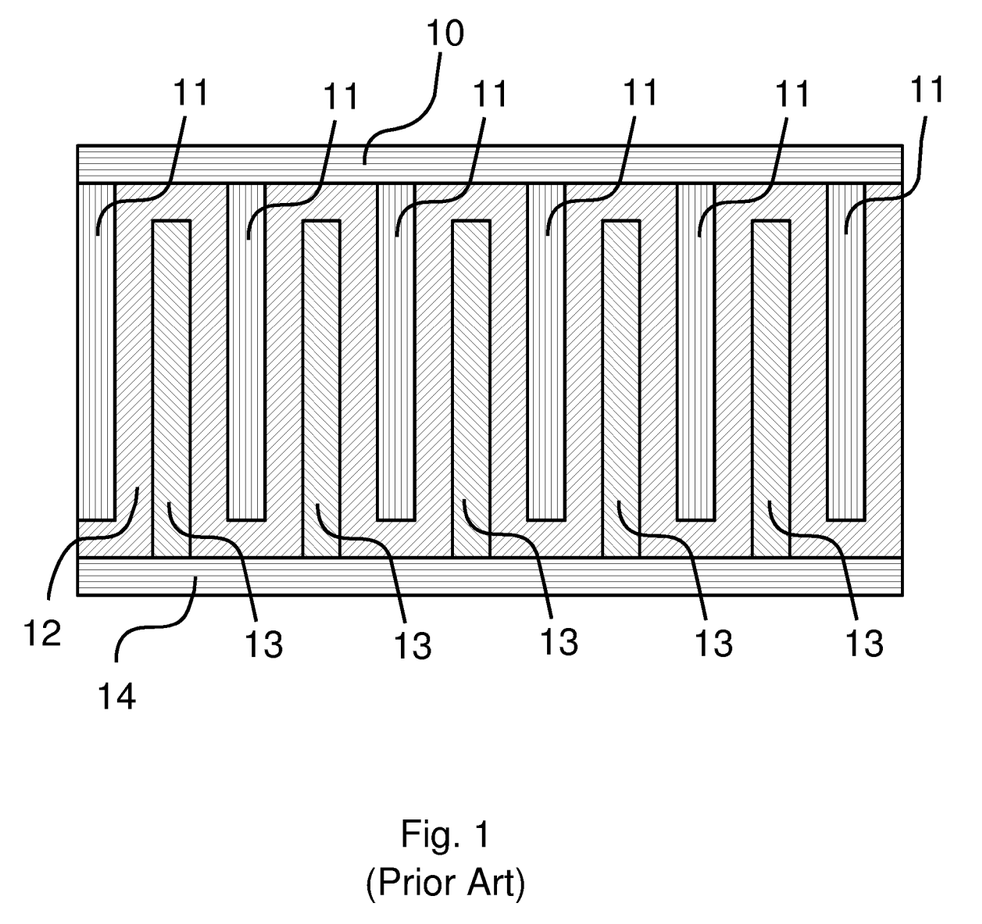
FIG. 1 is a schematic illustration of a cross section of one example of a three-dimensional lithium-ion battery that has been proposed in the literature.
Figure 2A:
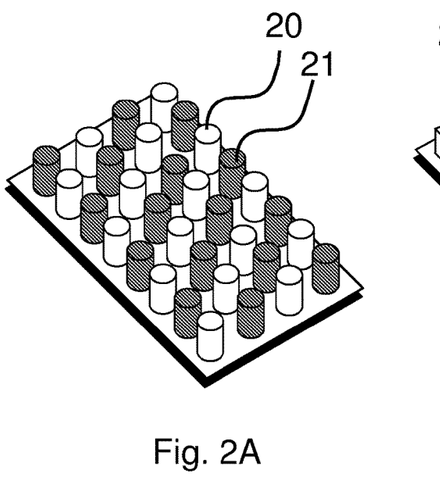
FIG. 2A-2D are schematic illustrations of some three-dimensional energy storage system architectures that may be used with an embodiment of the present invention.
Figure 2B:
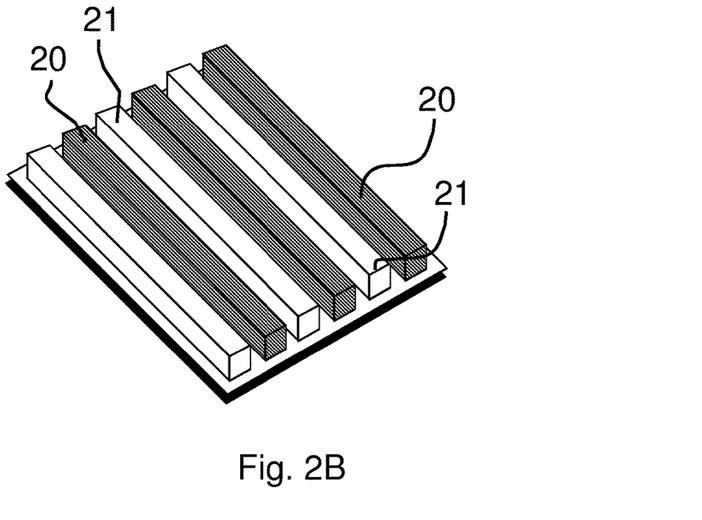
Figure 2C:
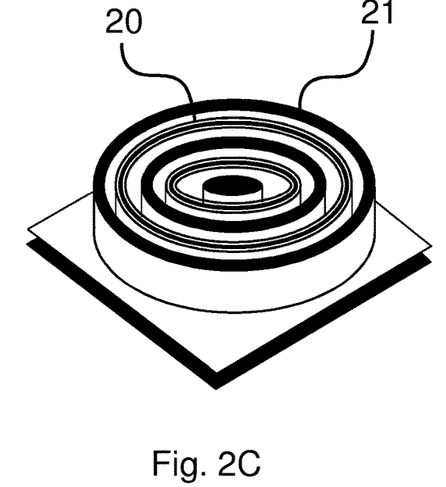
Figure 2D:
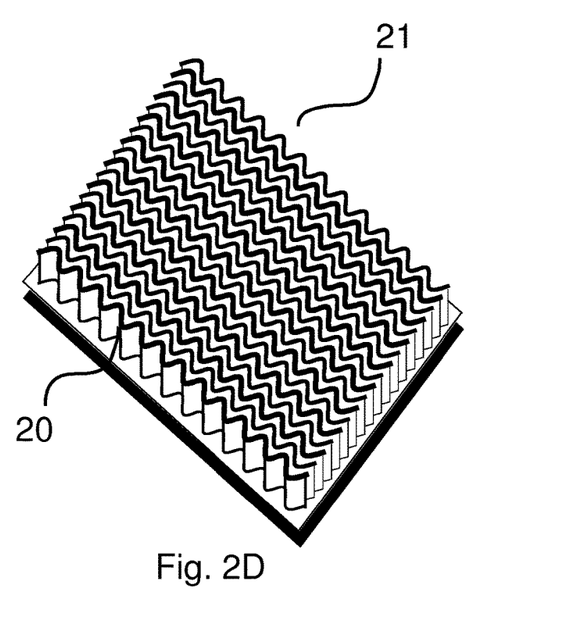

FIG. 1 shows a schematic representation of a cross-section of one example of a three-dimensional battery that has been proposed in the literature. The battery includes a cathode current collector 10 from which cathodes 11 extend in a height direction at various points. A similar structure is made with an anode current collector 14 and anodes 13. The regions between the cathodes 11 and the anodes 13 (and some areas of the current collectors 10 and 14) include electrolyte 12.

The cathodes 11 and anodes 13 may be assembled in various three-dimensional configurations. This can include, for example, inter-digitated pillars or plates where the anodes 13 and the cathodes 11 are in proximity to each other in more than one direction. For example, in FIG. 1, each anode 13 is in close proximity to two cathodes 11, one on either side. In structures such as pillars, each electrode could be in proximity to surfaces from more than two counter electrodes. The anode and cathode current collectors 10 and 14 can be separate (top and bottom connection as shown in FIG. 1) or co-planar.

However, three-dimensional battery architectures can present challenges for achieving adequate safety. Accordingly, improved safety features for three-dimensional batteries are needed in the art.

SUMMARY

Various three-dimensional battery structures are disclosed and claimed. In one such structure, the three-dimensional battery comprises a battery enclosure and a first plurality of electrodes within the enclosure. The first plurality of electrodes includes a plurality of cathodes and a plurality of anodes. The first plurality of electrodes includes a second plurality of electrodes selected from the first plurality of electrodes. The three-dimensional battery includes a first structural layer within the battery enclosure. Each of the second plurality of electrodes protrudes from the first structural layer. The three-dimensional battery includes a plurality of electrical current-reducing devices within the enclosure. Each of the second plurality of electrodes is coupled to one of the plurality of current-reducing devices. Other aspects and advantages of the present invention can be seen upon review of the figures, the detailed description, and the claims that follow.

DETAILED DESCRIPTION

Existing energy storage devices, such as batteries, fuel cells, and electrochemical capacitors, typically have two-dimensional laminar architectures (e.g., planar or spiral-wound laminates) with a surface area of each laminate being roughly equal to its geometrical footprint (ignoring porosity and surface roughness). A three-dimensional energy storage device can be one in which an anode, a cathode, and/or a separator are non-laminar in nature. For example, if electrodes protrude sufficiently from a backplane to form a non-laminar active battery component, then the surface area for such a non-laminar component may be greater than twice the geometrical footprint of its backplane. In some instances, given mutually orthogonal X, Y, Z directions, a separation between two constant-Z backplanes should be at least greater than a spacing between electrodes in an X-Y plane, divided by the square root of two.

Some examples of three-dimensional architectures that are capable of use with certain embodiments of the present invention, and that have cathodes and anodes protruding from the same backplane, are shown in FIG. 2. FIG. 2A shows a three-dimensional assembly with cathodes and anodes in the shape of pillars, FIG. 2B shows a three-dimensional assembly with cathodes and anodes in the shape of plates, FIG. 2C shows a three-dimensional assembly with cathodes and anodes in the shape of concentric circles, and FIG. 2D shows a three-dimensional assembly with cathodes and anodes in the shape of waves. Other configurations, such as honeycomb structures and spirals might also be used with certain embodiments of the present invention. In FIG. 2, cathodes 20 and anodes 21 protrude from the same backplane and are alternating in a periodic fashion. However, in other embodiments the cathodes 20 may protrude from a different backplane than anodes 21.

Described herein is the use of safety mechanisms for reducing temperature related reliability issues in three-dimensional energy storage systems and devices. Safety mechanisms according to certain embodiments of the present invention can be incorporated into a three-dimensional battery (e.g., a three-dimensional rechargeable lithium-ion battery), such that the safety mechanisms are internal to the battery. However, in conjunction with the disclosed internal safety mechanisms, an external protection mechanism (external thermal fuse, external circuit breaker) may also be used with a three-dimensional architecture. A shutdown separator may also be used for providing internal thermal protection.

Figure 3:
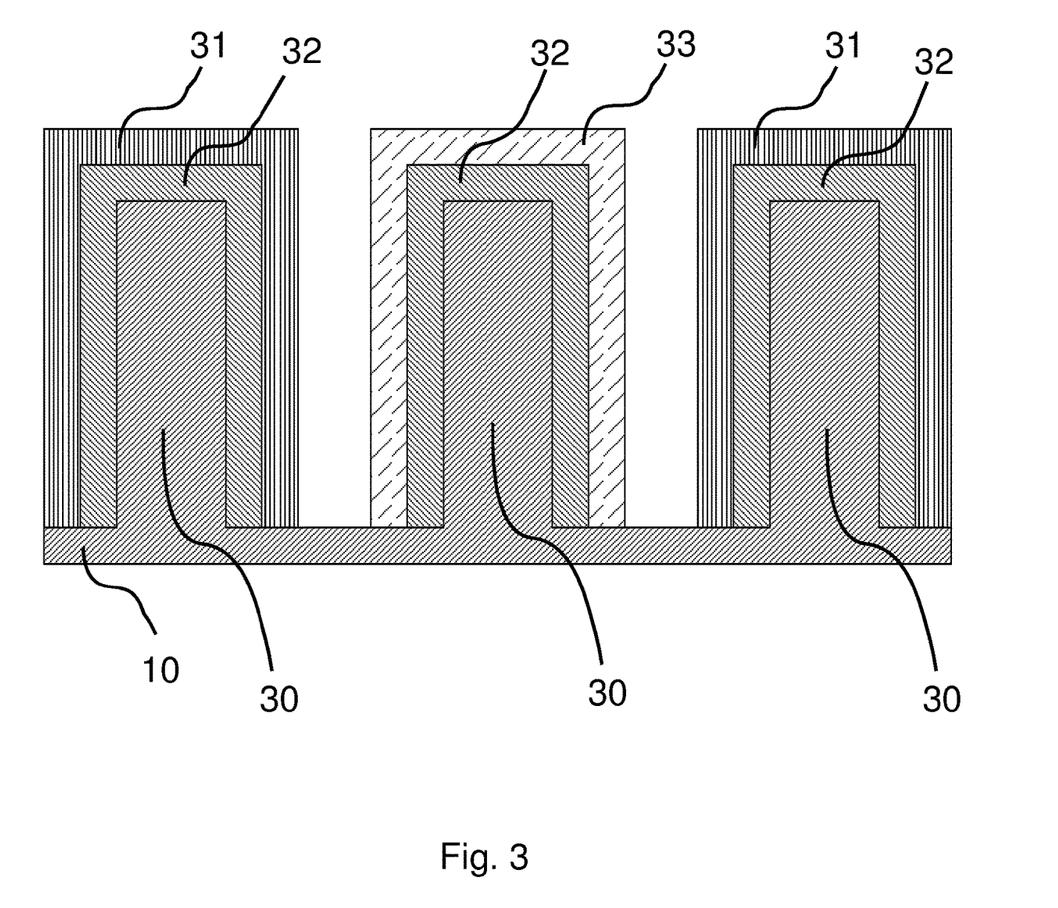
FIG. 3 is a cross-sectional schematic representation of a three-dimensional battery where a current collector also functions to dissipate heat, according to an embodiment of the invention.

The ability to reduce operating temperature by having a more thermally conductive electrode/current collector interface may be one mechanism for increasing stability. For example, a current collector and/or backbone structure for a three-dimensional battery may act as a heat sink, which in turn can reduce the probability of thermal runaway in case of a short-circuit ("short") or other high temperature event. FIG. 3 provides an example of a three-dimensional battery with components that also serve as heat sinks, among other things. In this example, the battery is constructed with a non-active backbone structure 30 on top of which an electrically conductive current collector 32 is deposited. A cathode 31 and an anode 33 are deposited using any of various methods on top of the current collector 32. The whole assembly can be submerged into a separator matrix to form the battery.

The battery of FIG. 3 has better heat sink characteristics, in part because of the availability of a higher surface area of the highly conductive current collector 32 relative to cathode or anode materials. In a two-dimensional design, a current collector may not transfer much heat since a transport of heat from an electrode/separator interface (which is where many high-temperature reactions occur) to the current collector can be significantly slower due to large transport distances through a mildly conducting active material porous matrix. By contrast, in certain three-dimensional arrays, transport distances are smaller, and a surface area of a current collector that is in contact with an electrode material can be significantly greater, thereby increasing heat transport. Heat dissipation can also be enhanced by the backbone structure 30 itself. For example, a thermal conductivity of the backbone structure 30 can be tailored to provide enhanced heat dissipation, while maintaining other desired properties for the backbone structure 30.

However, it would be preferable to design the electrode and current collector architecture to optimize other performance metrics, such as energy density, rather than to constrain the design of the electrode and current collector architecture based on their performance as a heat sink. Accordingly, three-dimensional designs that incorporate PTC materials in an integrated manner, including up to an individual electrode or sub-electrode level, are disclosed herein. Integrating the PTC material at the individual electrode level can increase sensitivity and provide more reliable isolation in the event of a short. Also, the use of such materials can lead to adequate safety even where the electrodes and current collectors do not function well as heat sinks.

Conducting polymer PTC materials typically comprise a polymer having electrically conductive particles. Under normal operating conditions many of the electrically conductive particles are in contact with each other so that the PTC material has a relatively low electrical resistance. However, when the temperature rises above a glass transition temperature of the PTC materials, for example if too high a current passes through the PTC material, then thermal expansion of the PTC material causes the conducting particles to separate and causes the electrical circuit to substantially open. In this state, the PTC material presents a higher electrical resistance to the current flow and thereby reduces the electrical current to a lower and safer level. Examples of such PTC materials include high density polyethylene loaded with graphite particles, titanate ceramic materials such as barium titanate, and so forth.

In certain embodiments of the present invention, PTC materials are integrated at a more fundamental level in a three-dimensional battery architecture, in order to provide enhanced safety. One such example is the architecture shown in FIG. 4. This architecture includes a battery enclosure 4 and a plurality of parallel plate electrodes (cathodes 42 and anodes 43) within the battery enclosure 4. The cathodes 42 preferably but not necessarily include lithium ion insertion electrodes comprising $LiCoO_2$, $Li(Ni_xCo_yAl_z)O_2$, $LiFePO_4$, $Li_2MnO_4$, or the like. The anodes 43 preferably comprise a material such as graphite, a titanate, silicon, aluminum, and/or tin. The cathodes 42 and anodes 43 are preferably assembled with a separator 44 between them. Each of a second plurality of electrodes (e.g., cathodes 42), selected from the first plurality of electrodes, protrudes from a first structural layer (e.g., current collector layer 40 or a layer underlying current collector layer 40) through a current-reducing device (e.g., an adjacent region of PTC material 41). Preferably, but not necessarily, the parallel plate electrodes comprise fins that protrude from the first structural layer at least 50 microns. Also within the battery enclosure 4, a third plurality of electrodes (e.g., anodes 43), selected from the first plurality of electrodes, protrudes from a second structural layer (e.g., current collector layer 46 or a layer underlying current collector layer 46) through current-reducing devices (e.g., adjacent regions of PTC material 45). The PTC material 41 provides a local fuse for each of the cathodes 42 and the PTC material 45 provides a local fuse for each of the anodes 43. In the event of a short involving one of the cathodes 42, a local isolation of that particular cathode 42 can take place due to a local expansion of the PTC material 41. Likewise, in the event of a short involving one of the anodes 43, a local isolation of that particular anode 43 can take place due to a local expansion of the PTC material 45. In addition to providing the ability to cut off individual sub-units in the battery, this architecture also increases the reliability of a shut-off process in the battery. This is due to an increase in the ability to detect heat in these sub-units.

Figure 4:
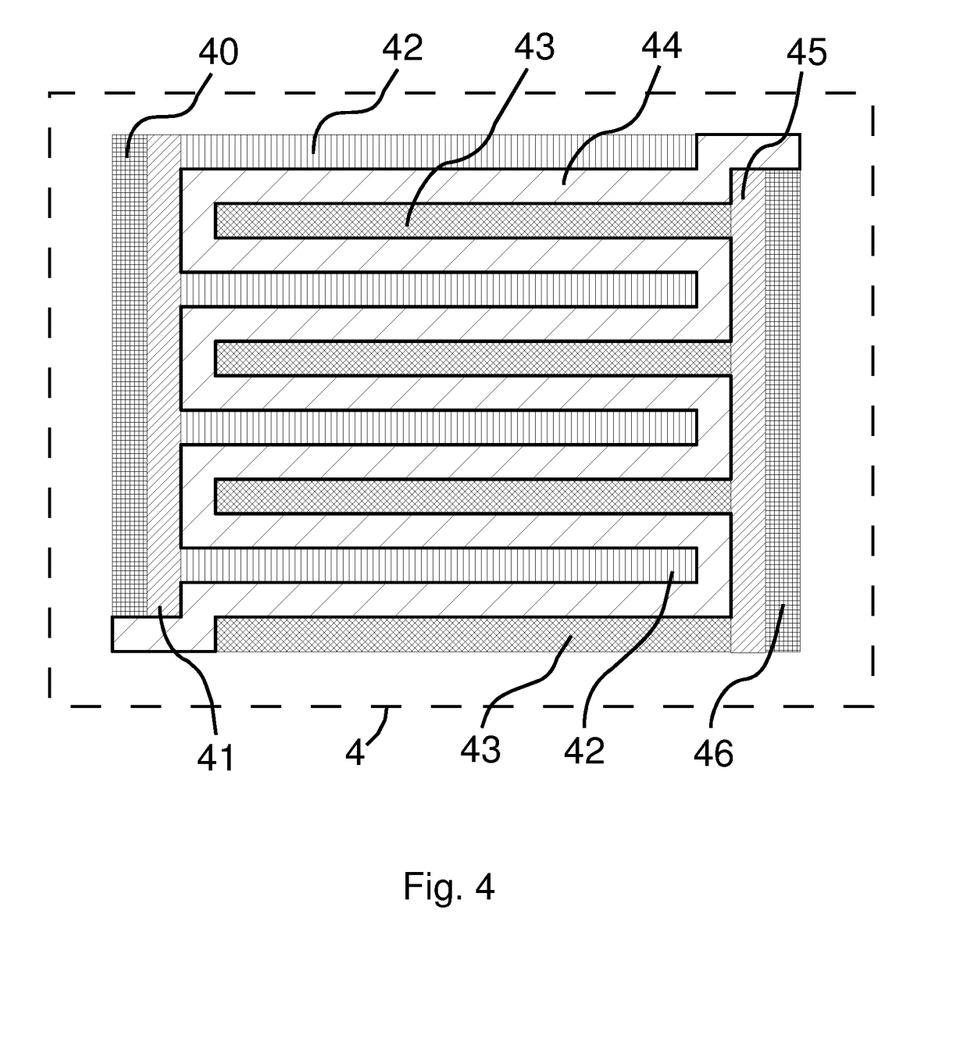
FIG. 4 is a schematic representation of the use of a PTC material integrated into an interdigitated fin design for a three-dimensional battery, according to an embodiment of the invention.

A characteristic of some three-dimensional batteries is that there are sub-unit micro-cells that contribute current to an overall larger cell. For example, if each sub-unit micro-cell in FIG. 4 is 100 microns, and the overall cell is 1 cm wide, there will be 100 cathodes and 100 anodes in the overall cell. Each cathode will, in normal operation, have $\frac{1}{100}$ of a total current passing through it. However, in the case of an electrical short, a current increases to an amount much higher than the normal current. This rapid increase in current will trigger a corresponding local increase in heat and ensure that the PTC material 41 is reliably triggered. This integration of a self-regulating fuse into a three-dimensional battery provides an advantageous safety feature, namely the ability to respond to shorts within an overall cell. This intra-cell shorting response feature is accomplished in certain embodiments due to the three-dimensional architecture and integrated PTC materials, wherein a current is split into multiple micro-cells within the overall cell. Each of these micro-cells can be independently monitored and regulated to provide increased level of safety.

Figure 5:
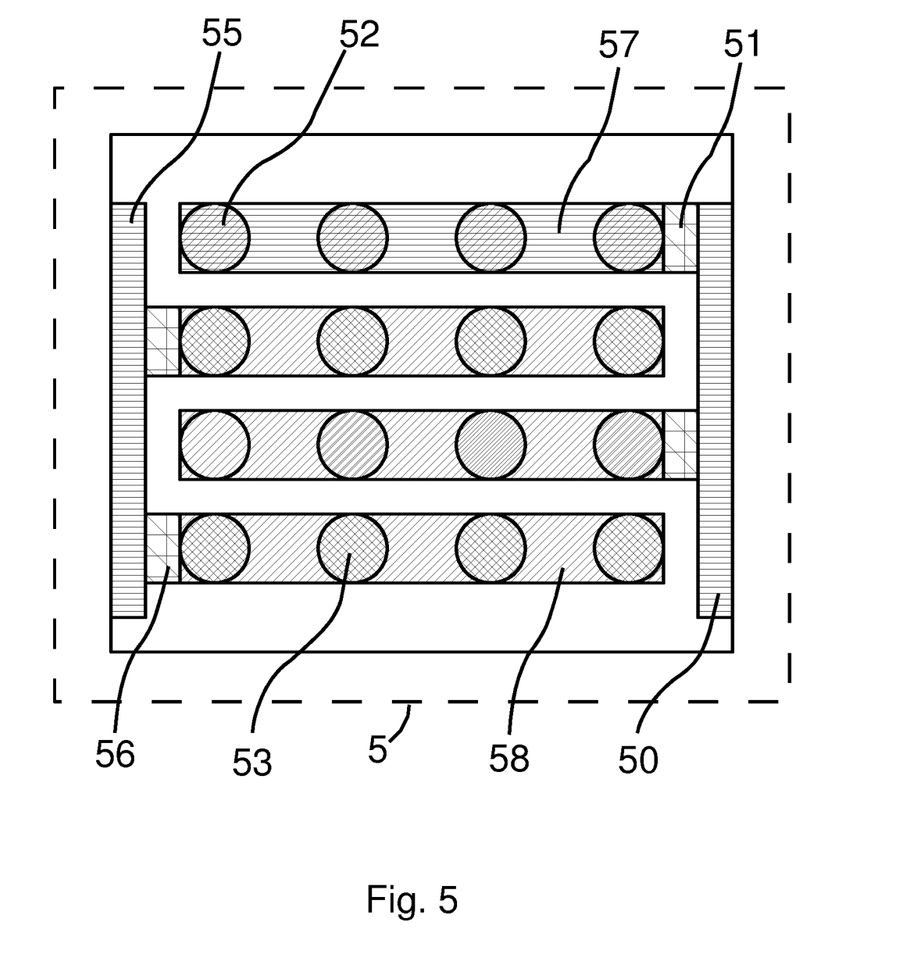
FIG. 5 is a schematic representation of the use of a PTC material integrated into an interdigitated pillar design for a three-dimensional battery with a top-side electrical connection, according to an embodiment of the invention.

FIG. 5 shows another example of an integration scheme for a PTC material 51, 56 on a three-dimensional architecture that includes a first plurality of electrodes within a battery enclosure 5, the first plurality of electrodes comprising an interdigitated array of pillars 52, 53. Each of a second plurality of electrodes (e.g., pillar-shaped cathodes 52), selected from the first plurality of electrodes, protrudes from a first structural layer 57. Also within the battery enclosure 5, a third plurality of electrodes (e.g., pillar-shaped anodes 53), selected from the first plurality of electrodes, protrudes from a second structural layer 58. Structural layers 57 and 58 may be electrically conductive or include an electrically conductive coating.

In the embodiment of FIG. 5, current collector 50 provides an electrical path to cathodes 52 via PTC material 51. This approach provides flexibility to incorporate the PTC material 51 in a variable fashion. For example, the PTC material 51 can be added at any place along the current collector 50. A design may specify or optimize a specific number of cathodes 52 that are connected without being separated by the PTC material 51. Likewise, current collector 55 provides an electrical path to anodes 53 via PTC material 56. The PTC material 56 can be added at any place along the current collector 55. A design may specify or optimize a specific number of anodes 53 that are connected without being separated by the PTC material 56.

That is, the PTC material 51 provides a local fuse for groups of cathodes 52 and the PTC material 56 provides a local fuse for groups of anodes 53. In the event of a short involving one of the cathodes 52, a local isolation of its associated group of cathodes 52 can take place due to a local expansion of the PTC material 51. Likewise, in the event of a short involving one of the anodes 53, a local isolation of its associated group of anodes 53 can take place due to a local expansion of the PTC material 56. This provides the ability to cut off particular sub-groups of electrodes within the battery enclosure 5, and thereby increases the reliability of a shut-off process in the battery.

Figure 6:
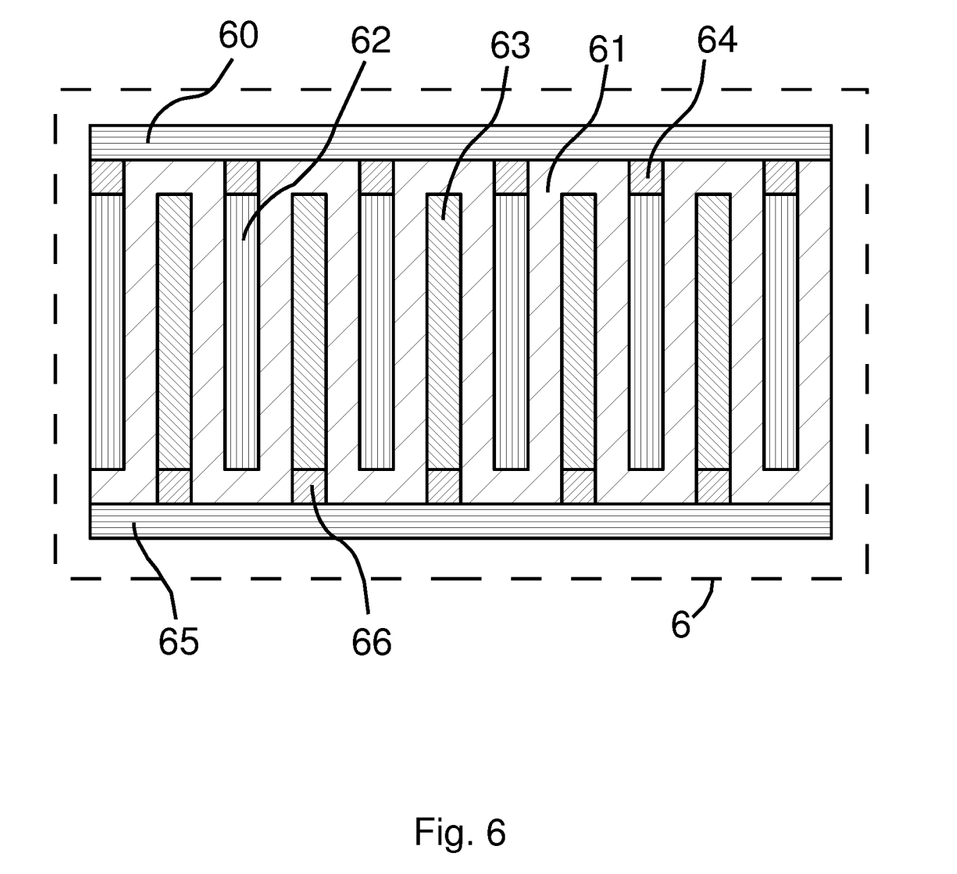
FIG. 6 is a schematic representation of the use of a PTC material integrated into a three-dimensional battery in an individual electrode unit level, according to an embodiment of the invention.

FIG. 6 addresses another approach to use a PTC material 64 in a three-dimensional battery. This approach allows isolation of each cathode 61 and anode 62 in the event of a temperature increase. In this approach, the PTC material 64 is integrated into every cathode 61 and anode 62 before it is connected to a current collector 60. In this case, a separator 63 inhibits the PTC material 64 from shorting.

The embodiment of FIG. 6 includes a battery enclosure 6 and a first plurality of electrodes (cathodes 62 and anodes 63) within the battery enclosure 6. The cathodes 62 and anodes 63 preferably but not necessarily include lithium ion insertion electrodes comprising $LiCoO_2$ or the like, and are assembled with a separator 61 in between. Each of a second plurality of electrodes (e.g., anodes 63), selected from the first plurality of electrodes, protrudes from a first structural layer (e.g., current collector layer 65 or a layer underlying current collector layer 65) through a current-reducing device (e.g., PTC material 66). Also within the battery enclosure 6, a third plurality of electrodes (e.g., cathodes 62), selected from the first plurality of electrodes, protrudes from a second structural layer (e.g., current collector layer 60 or a layer underlying current collector layer 60) through current-reducing devices (e.g., PTC material 64). The PTC material 64 provides a local fuse for each of the cathodes 62 and the PTC material 66 provides a local fuse for each of the anodes 63. In the event of a short involving one of the cathodes 62, a local isolation of that particular cathode 62 can take place due to a local expansion of the PTC material 64. Likewise, in the event of a short involving one of the anodes 63, a local isolation of that particular anode 63 can take place due to a local expansion of the PTC material 66.

Traditional PTC materials can be reversible in nature, which means that an isolated electrode may be electrically reconnected once an event that changed the state of the PTC material has passed. This provides the advantage of maintaining the capacity of an energy storage device. A similar result may be obtained by replacing the PTC material with solid-state switches that are responsive to a detector of current or temperature. However, in certain embodiments of the present invention, the PTC materials can be replaced with fuse-like materials that provide permanent open circuits in the event of a short, thereby isolating that particular electrode permanently. Such a permanent mechanism may be preferable in certain three-dimensional batteries, for example where each micro-cell accounts for very small values in terms of total current and capacity. Such a battery can continue to operate at a high level of efficiency even when a few micro-cells are permanently isolated in response to shorting.

While the invention has been described with reference to the specific exemplary embodiments thereof, it should be understood by those skilled in the art that various changes may be made and equivalents may be substituted without departing from the true spirit and scope of the invention as defined by the appended claims. It is contemplated that various features and aspects of the invention may be used individually or jointly and possibly in a different environment or application. The specification and drawings are, accordingly, to be regarded as illustrative and exemplary rather than restrictive. "Comprising," "including," and "having," are intended to be open-ended terms.

What is claimed is:

1. A battery comprising
   a battery enclosure,
   a first layer comprising an anode current collector,
   a plurality of anodes extending from the first layer and electrically connected, in parallel, to the anode current collector by parallel electrically conductive anode pathways, the plurality of anodes comprises more than one anode,
   a second layer comprising a cathode current collector,
   a plurality of cathodes extending from the second layer and electrically connected, in parallel, to the cathode current collector by parallel electrically conductive cathode pathways, the plurality of cathodes comprises more than one cathode, and
   an electrical current-reducing device layer,
   wherein
   the anode current collector, the plurality of anodes, the electrically conductive anode pathways, the cathode current collector, the plurality of cathodes, the electrically conductive cathode pathways, the first and second layers, and the electrical current-reducing device layer are within the battery enclosure,
   the plurality of anodes and the plurality of cathodes are interdigitated and in direct contact with a common electrolyte for ion exchange between the anodes and the cathodes during operation of the battery,
   each member of the plurality of anodes has a surface area, ignoring porosity and surface roughness, that exceeds its geometrical footprint in the first layer by a factor of at least 2,
   each member of the plurality of cathodes has a surface area, ignoring porosity and surface roughness, that exceeds its geometrical footprint in the second layer by a factor of at least 2, and
   wherein (i) each anode of the plurality of anodes is individually connected in parallel to the anode current collector through the electrical current-reducing device layer, or (ii) each cathode of the plurality of cathodes is individually connected in parallel to the cathode current collector through the electrical current-reducing device layer, the electrical current-reducing device layer comprising electrically conductive particles.

2. The battery of claim 1, wherein the electrical current-reducing device layer comprises electrically conductive positive-temperature-coefficient (PTC) polymer.

3. The battery of claim 1, wherein the electrical current-reducing device layer comprises an electrically conductive polymer having the electrically conductive particles.

4. The battery of claim 3, wherein the electrically conductive particles separate from each other during thermal expansion caused by increased temperature to increase the electrical resistance of the electrically conductive polymer.

5. The battery of claim 3 wherein the electrically conductive polymer comprises polyethylene including graphite particles.

6. The battery of claim 1 wherein the plurality of anodes comprises lithium ion insertion electrodes.

7. The battery of claim 1 wherein the plurality of anodes comprises a material selected from the group consisting of graphite, a titanate, silicon, aluminium and tin.

8. The battery of claim 1 wherein the plurality of cathodes comprises a material selected from the group consisting of $LiCoO_2$, $Li(Ni_xCo_yAl_z)O_2$, $LiFePO_4$, and $Li_2MnO_4$.

9. The battery of claim 1 wherein the plurality of anodes comprise fins protruding at least 50 microns from the anode current collector.

10. The battery of claim 1 wherein the plurality of cathodes comprises fins protruding at least 50 microns from the cathode current collector.

11. The battery of claim 1 wherein the first layer and the second layer oppose one another.

12. The battery of claim 1, wherein the electrical current-reducing device layer is disposed adjacent the anode current collector.

13. The battery of claim 1, wherein the electrical current-reducing device layer is disposed adjacent the cathode current collector.

14. The battery of claim 1, comprising a first electrical current-reducing device layer that electrically connects in parallel each anode of the plurality of anodes to the anode current collector, and a second electrical current-reducing device layer that electrically connects in parallel each cathode of the plurality of cathodes to the cathode current collector.

* * * * *